United States Patent
Hansen

(10) Patent No.: US 11,032,243 B2
(45) Date of Patent: *Jun. 8, 2021

(54) USING INDIVIDUALIZED APIS TO BLOCK AUTOMATED ATTACKS ON NATIVE APPS AND/OR PURPOSELY EXPOSED APIS WITH FORCED USER INTERACTION

(71) Applicant: Shape Security, Inc., Santa Clara, CA (US)

(72) Inventor: Marc Hansen, Mountain View, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,085

(22) Filed: Aug. 27, 2019

(65) Prior Publication Data

US 2019/0394168 A1 Dec. 26, 2019

Related U.S. Application Data

(63) Continuation of application No. 16/102,716, filed on Aug. 13, 2018, now Pat. No. 10,397,187, which is a
(Continued)

(51) Int. Cl.
*H04L 29/06* (2006.01)
*H04W 12/084* (2021.01)
(Continued)

(52) U.S. Cl.
CPC ...... *H04L 63/0227* (2013.01); *H04L 63/0245* (2013.01); *H04L 63/1441* (2013.01);
(Continued)

(58) Field of Classification Search
CPC ... H04L 41/042; H04L 63/00; H04L 63/1416; G06F 17/30029
See application file for complete search history.

(56) References Cited

U.S. PATENT DOCUMENTS 5,828,833 A 10/1998 Belville et al.
5,974,549 A 10/1999 Golan
(Continued)

FOREIGN PATENT DOCUMENTS

| EP | 15819670.9 | 1/2018 |
| EP | 15832981.3 | 3/2018 |
| GB | 2465998 | 9/2010 |

OTHER PUBLICATIONS

NOA, mailed on Mar. 10, 2017, re: Justin D. Call, U.S. Appl. No. 14/466,779, filed Aug. 22, 2014.
(Continued)

*Primary Examiner* — Christopher C Harris
(74) *Attorney, Agent, or Firm* — Troutman Pepper Hamilton Sanders LLP (Rochester)

(57) ABSTRACT

An API call filtering system filters responses to API call requests received, via a network, from UEs. The API call filtering system is configured to require personalized API call requests wherein each API call (except for some minor exceptions) includes a unique UE identifier ("UEIN") of the UE making the request. Using the UEIN, the web service or other service protected by the API call filtering system can be secured against excessive request iterations from a set of rogue UEs while allowing for ordinary volumes of requests of requests the UEs, wherein one or more boundaries between what is deemed to be an ordinary volume of requests and what is deemed to be excessive request iterations are determined by predetermined criteria.

12 Claims, 7 Drawing Sheets

Related U.S. Application Data continuation of application No. 14/691,540, filed on Apr. 20, 2015, now Pat. No. 10,050,935, which is a continuation-in-part of application No. 14/327,461, filed on Jul. 9, 2014, now Pat. No. 9,258,274.

(51) Int. Cl.
*H04W 12/086* (2021.01)
*H04W 12/122* (2021.01)
*H04W 12/126* (2021.01)

(52) U.S. Cl.
CPC ....... *H04W 12/084* (2021.01); *H04W 12/086* (2021.01); *H04W 12/122* (2021.01); *H04W 12/126* (2021.01); *H04L 63/0442* (2013.01); *H04L 63/10* (2013.01); *H04L 63/20* (2013.01)

(56) References Cited

U.S. PATENT DOCUMENTS

| | | | |
|---|---|---|---|
| 7,913,300 | B1 | 3/2011 | Flank et al. |
| 8,782,744 | B1 | 7/2014 | Fuller et al. |
| 9,027,039 | B2 | 5/2015 | Michels et al. |
| 9,313,203 | B2 | 4/2016 | Adler et al. |
| 2004/0111485 | A1 | 6/2004 | Mimatsu et al. |
| 2004/0237071 | A1 | 11/2004 | Hollander et al. |
| 2005/0165902 | A1 | 7/2005 | Hellenthal et al. |
| 2006/0095968 | A1 | 5/2006 | Portolani et al. |
| 2007/0276950 | A1 | 11/2007 | Dadhia |
| 2008/0183902 | A1 | 7/2008 | Cooper et al. |
| 2008/0244078 | A1 | 10/2008 | Viljoen et al. |
| 2009/0144829 | A1 | 6/2009 | Grigsby et al. |
| 2009/0158430 | A1 | 6/2009 | Borders |
| 2009/0193497 | A1 | 7/2009 | Kikuchi et al. |
| 2011/0289566 | A1 | 11/2011 | Resch et al. |
| 2012/0131354 | A1 | 5/2012 | French |
| 2012/0180021 | A1 | 7/2012 | Byrd et al. |
| 2012/0246722 | A1 | 9/2012 | Boney |
| 2013/0055287 | A1 | 2/2013 | Pope et al. |
| 2013/0139235 | A1 | 5/2013 | Counterman |
| 2013/0205919 | A1 | 8/2013 | Bousack et al. |
| 2013/0212603 | A1 | 8/2013 | Cooke et al. |
| 2013/0347094 | A1 | 12/2013 | Bettini et al. |
| 2014/0007048 | A1 | 1/2014 | Qureshi et al. |
| 2014/0040787 | A1 | 2/2014 | Mills |
| 2014/0123242 | A1 | 5/2014 | Sprunk et al. |
| 2014/0181896 | A1 | 6/2014 | Yablokov et al. |
| 2014/0189845 | A1 | 7/2014 | Cai et al. |
| 2014/0237594 | A1 | 8/2014 | Bhattacharya et al. |
| 2014/0282821 | A1 | 9/2014 | Adler et al. |
| 2014/0283068 | A1 | 9/2014 | Call et al. |
| 2015/0200955 | A1 | 7/2015 | Martin |
| 2015/0350234 | A1 | 12/2015 | Reno et al. |
| 2015/0365348 | A1 | 12/2015 | Matsuda |
| 2016/0014076 | A1 | 1/2016 | Hansen |
| 2016/0014084 | A1 | 1/2016 | Hansen |
| 2016/0057107 | A1 | 2/2016 | Call et al. |
| 2016/0162688 | A1 | 6/2016 | Call et al. |
| 2018/0026943 | A1 | 1/2018 | Call et al. |
| 2018/0359216 | A1 | 12/2018 | Hansen |
| 2019/0394168 | A1 | 12/2019 | Hansen |

OTHER PUBLICATIONS

CTNF, mailed on Oct. 6, 2014, re: Marc Hansen, U.S. Appl. No. 14/327,461, filed Jul. 9, 2014.
NOA, mailed on Jun. 3, 2015, re: Marc Hansen, U.S. Appl. No. 14/327,461, filed Jul. 9, 2014.
NOA, mailed on Oct. 15, 2015, re: Marc Hansen, U.S. Appl. No. 14/327,461, filed Jul. 9, 2014.
NOA, mailed on Oct. 24, 2016, re: Justin Call, U.S. Appl. No. 14/466,779, filed Aug. 22, 2014.
CTFR, mailed on Jun. 17, 2016, re: Justin Call, U.S. Appl. No. 14/466,779, filed Aug. 22, 2014.
CTNF, mailed on Jan. 20, 2016, re: Justin Call, U.S. Appl. No. 14/466,779, filed Aug. 22, 2014.
CTNF, mailed on Nov. 24, 2014, re: Justin Call, U.S. Appl. No. 14/466,779, filed Aug. 22, 2014.
CTFR, mailed on Jun. 17, 2015, re: Justin Call, U.S. Appl. No. 14/466,779, filed Aug. 22, 2014.
NOA, mailed on Aug. 11, 2016, re: Justin Call, U.S. Appl. No. 14/563,336, filed Dec. 8, 2014.
CTNF, mailed on Mar. 25, 2016, re: Justin Call, U.S. Appl. No. 14/563,336, filed Dec. 8, 2014.
CTFR, mailed on Jul. 18, 2016, re: Marc Hansen, U.S. Appl. No. 14/691,540, filed Apr. 20, 2015.
CTNF, mailed on Jan. 5, 2016, re: Marc Hansen, U.S. Appl. No. 14/691,540, filed Apr. 20, 2015.
CTNF, mailed on May 5, 2016, re: Marc Hansen, U.S. Appl. No. 14/984,435, filed Dec. 30, 2015.
CTNF, mailed on Oct. 28, 2015, re: Marc Hansen, U.S. Appl. No. 14/984,435, filed Dec. 30, 2015.
CTFR, mailed on Jan. 5, 2017, re: Marc Hansen, U.S. Appl. No. 14/984,435, filed Dec. 30, 2015.
CTNF, mailed on May 18, 2017, re: Marc Hansen, U.S. Appl. No. 14/691,540, filed Apr. 20, 2015.
NOA, mailed on Nov. 6, 2017, re: Marc Hansen, U.S. Appl. No. 14/691,540, filed Apr. 20, 2015.
CTNF, mailed on Nov. 19, 2018, re: Marc Hansen, U.S. Appl. No. 16/102,716, filed Aug. 13, 2018.
NOA, mailed on Apr. 8, 2019, re: Marc Hansen, U.S. Appl. No. 16/102,716, filed Aug. 13, 2018.
In-the-wire authentication: Protecting client-side critical data fields in secure network transactions, Jan. 14, 2009.
A Closer Look at Rapport from Trusteer, Apr. 29, 2010.
International Search Report, dated Feb. 4, 2016, PCT/US15/63811.
International Search Report, dated Nov. 5, 2015, PCT/US15/44630.
International Search Report, dated Oct. 23, 2015, PCT/US15/39762.
Extended European Search Report for Corresponding EP Patent Application No. 19210099.8, dated Dec. 18, 2019.

US 11,032,243 B2

USING INDIVIDUALIZED APIS TO BLOCK AUTOMATED ATTACKS ON NATIVE APPS AND/OR PURPOSELY EXPOSED APIS WITH FORCED USER INTERACTION

FIELD OF THE INVENTION

The present invention relates generally to network computer system security and more particularly to defense against some automated attacks on the network computer system.

BACKGROUND

The Internet (and related networks) can be used to send e-mails, conduct business, automate machinery and data processing. Connected users can use the Internet to interact with other connected users and/or connected computer systems. Some of the Internet traffic is wanted by the parties involved, but other traffic is unwanted by at least one party. For example, by some estimates, more than three quarters of daily e-mail volume over the Internet is unwanted by its targeted recipient (sometimes referred to as "spam"). More than just e-mail traffic is unwanted by its targeted recipient. For example, banks, bank customers, and bank network operators and managers do not want traffic that is attempting to manipulate the bank's online banking system to facilitate fraud. Of course, in today's world, there is some traffic that is wanted and/or necessary, so one task that online systems operators have to deal with is separating the wanted traffic from the unwanted traffic, letting the wanted traffic through and blocking the unwanted traffic.

For example, the typical e-mail recipient does not want to receive all unsolicited commercial offers. The online network operator that limits access to resources to authorized users does not want to receive traffic from unauthorized users. Unfortunately, the initiators of such unwanted traffic really want to send it, and will attempt to do so even if it requires getting around limits and controls placed by the online network operator. This creates an "arms race" between the initiators of unwanted traffic and the online network/systems operator.

There are many reasons a sender of unwanted traffic might want to initiate the traffic. Often, those are financial reasons. For example, if a scammer can send out one million e-mails with a total expenditure of less than ten dollars and a half hour of time, and reap a few dollars in profits from just 0.01% of the e-mail recipients, it is cost-effective for the scammer to do so. If an criminal organization can apply 100,000 username-password pairs to an e-commerce website to find the 0.01% that are vulnerable, they would do so if the monetary returns from hacking ten user accounts is greater than the cost to the criminal organization of obtaining the username-password pairs plus the cost of executing 100,000 attempted logins.

These unwanted attacks could be thwarted using guaranteed secure methods to filter out unwanted/unauthorized traffic from wanted/authorized traffic. However, as illustrated from the examples above, even a 99.99% success rate at blocking attacks would still allow enough traffic through to be a cost-effective attack. Some of this economics comes about because automation lowers the cost of transactions. Ironically, the very automation that makes it economically feasible for a bank, retailer, music distributor, online storage vendor, etc. to provide a low-cost service to millions of its customers also makes it economically feasible for a criminal or criminal organization to make millions of attempts to get at network resources in an unauthorized way.

If the effort required to mount an attack on a network resource can be raised so that it is uneconomical to attack (but still easy enough for authorized users to access), the attacks might be reduced. Therefore, it would be desirable to increase the efforts/costs of access to the network resource in a way that makes it uneconomical for an organization to mount an attack on network resources, while allowing authorized uses.

SUMMARY OF THE EMBODIMENTS

An API call filtering system filters responses to API call requests received, via a network, from user equipment ("UE") such as mobile phones, tablets, computers, and other UEs. The API call filtering system is configured to require personalized API call requests wherein each API call (except for some minor exceptions) includes a user equipment installation number ("UEIN") of the UE making the request. Using the UEIN, the web service or other service protected by the API call filtering system can be secured against excessive request iterations from a set of rogue UEs while allowing for ordinary volumes of requests of requests the UEs, wherein one or more boundaries between what is deemed to be an ordinary volume of requests and what is deemed to be excessive request iterations are determined by predetermined criteria.

The UE might execute UE apps, at least one of which sends requests via a network to a server or service that has been secured against excessive request iterations from a set of rogue UEs while allowing for ordinary volumes of requests from UEs. Those requests are first processed by the API call filtering system. An example UE might comprise an app initiator that processes data about, by, or for the UE, storage for one or more UEINs, wherein at least one UEIN is associated with the UE, and a request generator, that generates requests to be sent over the network to the service while identifying the UE in the requests.

Requests from UEs might include requests to authenticate the UE with respect to a secured account maintained at or for the API call filtering system. Verification might be performed by having the API call filtering system generate a random number for the UEs, with the iterations possible from a UE limited by some user interaction required as part of the generation process.

The following detailed description together with the accompanying drawings will provide a better understanding of the nature and advantages of the present invention.

Figure 1:
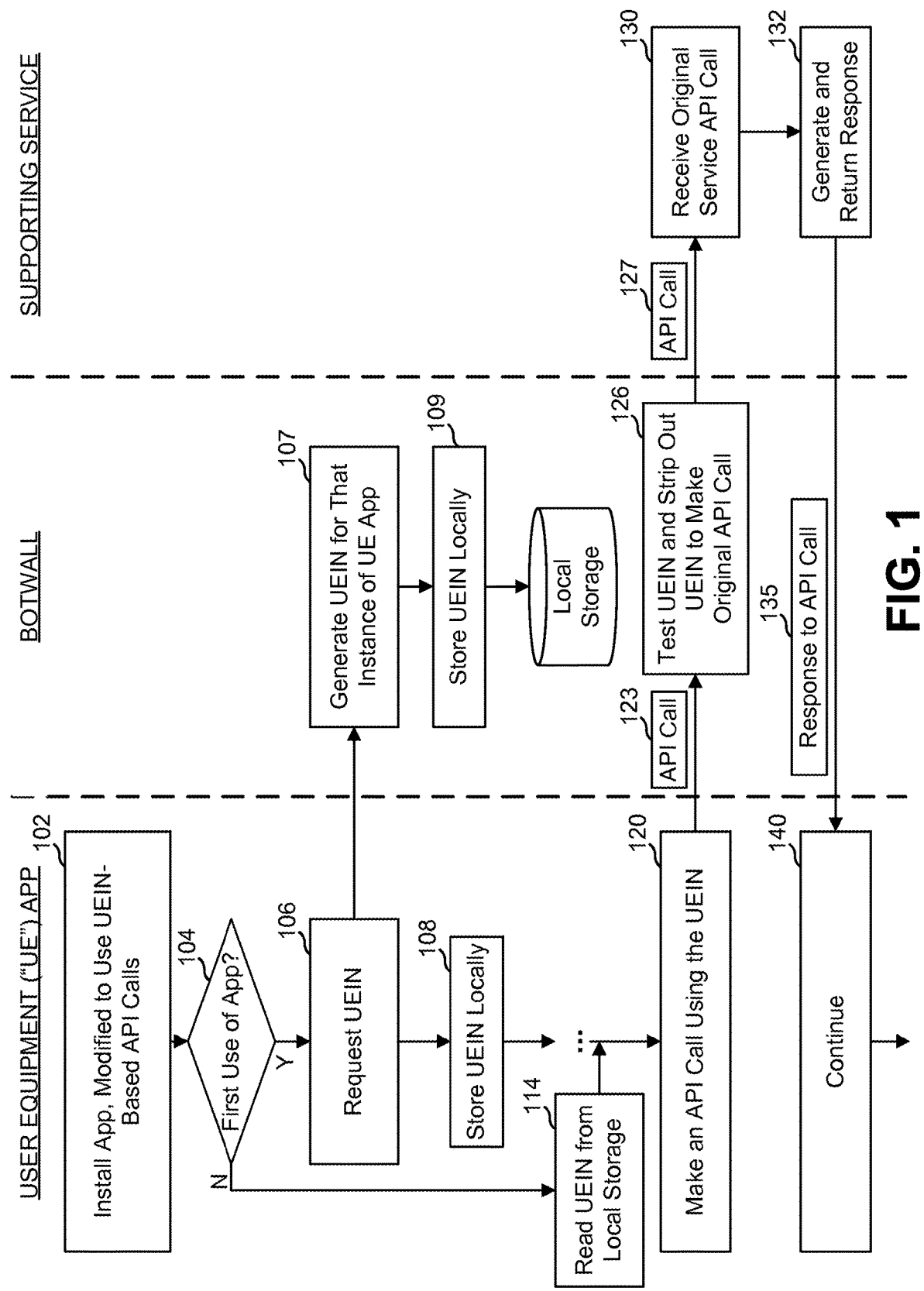
FIG. 1 is a swim diagram illustrating interactions of an example new app initialization process.

In the figures, like reference symbols in the various drawings indicate like elements, and multiple instances of objects might be denoted parenthetically (e.g., 101(1), 101(2), . . . , 101(*n*)). Where numbered objects in figures are shown with parenthetical sub-numbers ranging from 0 or 1 up to some letter designation (e.g., "1, 2, . . . , k" or 1, 2, . . . , n"), it should be understood that the letter designation represents some finite number the value of which is not essential for the understanding of the invention, unless otherwise indicated.

DETAILED DESCRIPTION

Network resources might include information, financial value, computing resources, or the like. For example, online-stored e-mails, online-stored personal photo, bank accounts with online transfer capability, online shopping services, computing power, etc., are all forms of network resources.

Network services might include uploading data, downloading data, interacting with server-side programs over a network, access to physical resources (e.g., printers, cameras, other equipment, etc.), communication services, or similar services that might be provided over a network. Network services might be provided by an HTTP server coupled to a back-end data processing system, or the like. Other network protocols might be used, as appropriate.

The network can be the Internet, an intranet, an extranet, a LAN, WAN or similar network that connects computers/devices/systems at network nodes to at least some other network nodes, thereby allowing users to use the network services.

As used herein, at least for the sake of readability, participants in a transaction might be referred to as a "user" and a "network service provider" but it should be understood that these labels might sometimes refer to humans or computers as users and/or persons, business groups, organizations, etc. as network service providers, even though specifically and technically it may well be that an electronic device operated by, or at the behest of, a user is what is doing the interaction and the interaction is with computer/electronic hardware operated by, or at the behest of, a network service provider. Herein, UEs are devices that a user might use to access resources of the network service provider. UEs might include computers, tablets, wearable computer devices, smartphones, embedded computer systems, or other devices.

Also, for the sake of readability, explanations are provided in the context of a user/UE running an "app" that interacts over the network with a server where the app and the server are coordinated such that the way the app interacts with the server is at least familiar to the server and vice versa. Unless otherwise indicated, the app can be a program executed by a processor and running on the UE in user space, in system space, in browser space, etc. and can be a simple or complex program with a general or specific purpose. Thus, the "app" designation herein is not, unless otherwise indicated, limited to specific types of programs.

Most often, network resources are constrained so access to those network resources should be limited to those users and UEs that are authorized to access those resources and mechanisms would be used to block unauthorized access to those resources, or at least thwart unauthorized access enough to make it uninteresting to those persons or organizations that would attempt unauthorized access. Common examples of network resources that are constrained might include a messaging (e-mail, text, etc.) server that sends, stores, retrieves messages, some of which are not intended to general viewing, or an online banking application that might provide access to confidential financial information and the ability to transfer funds or obligate an account owner in some way.

One approach to this dichotomy—one that makes it easy for authorized users to get in and access those network resources, but makes it hard for unauthorized users to do so—is to make it so that both authorized users and unauthorized users have to manually interact with the security system that protects a network resource. For example, a webserver and system that allows users and UEs to initiate transactions to transfer money, purchases, or other markers of value from the system operator to the control of the initiator will want to control access. As a specific example, an online clothing retailer might allow anyone to shop online and cause products to accumulate in an online "shopping cart" but then before the transaction is consummated, the user is authenticated, necessary financial details are made, and the user is requested to pass a Turing test (such as a CAPTCHA test), to thwart attempts to automatically attempt to purchase goods using a large number of purloined user-name-password pairs.

While in some cases this is an easy feature to provide, in other cases it is not so straightforward. For example, where there is direct user interaction, the user interface can be such that it requires a human user to interact with the user interface in order to accomplish a task. While that might be good for thwarting automated attacks, it would also block legitimate automated actions. Moreover, introducing additional steps that require user interaction may discourage legitimate users, which can decrease the usefulness of the service offered and often directly impact the revenue of the service provider.

Suppose a bank provides a way for friends to transfer small amounts among themselves and that way is to have each person call a call center and describe the details of the desired transaction to a call center operator. That is likely to be infeasible. It is more feasible to have the transaction done entirely by the user interacting with a computer system, such as a website that allows users to transfer small amounts of money. Since it is expected that individual users would manually be accessing the website (and that unauthorized organizations would attempt automated programmatic access to the website), by only allowing direct website interfacing, the unauthorized access can be made more difficult (and thus less cost-effective).

This works well, until users and network resource managers decide that they want to allow for some interaction that is not manual. For example, suppose five friends are playing an online poker game for real money. When one friend wins a hand, the others would transfer some small amount to the winner. If the only way to transfer funds is for pairs of players to manually interact with the network resource that manages the funds transfers, this can be cumbersome. At the end of each hand, the players would stop, look at the online poker game program to determine how much they won/lost and to whom, and then look to a financial transfers program to make the corresponding transactions.

Rather than require each of the players to manually navigate a money transfer program interface each hand, the online poker game might handle that process directly by sending commands to indicate transfers after each hand.

Typically, this might be done using an application programming interface ("API"), wherein non-human programs are given a structure to create interactions with the network resource in expected and authorized ways. But then this may then create a problem with unauthorized automated network access.

In some ways, it might be easy to describe transactions and interactions that are legitimate and those that are not legitimate. For example, a transfer of 25 cents every few minutes from Alice's poker funds account to Bob's poker funds account might be a legitimate set of transactions. Carol attempting to log in to her poker funds account three times might also be a legitimate set of transactions. Attempted transfers of $100 every fifteen seconds would not be a legitimate set of transactions for an online poker game among friends, nor would logging in to the poker system using Carol's credentials and trying 10,000 possible passwords.

Some times this filtering is hard and sometimes it is easy. One aspect of filtering that would make it easier to separate the authorized accesses from the unauthorized accesses is to identify and flag behaviors that seem unauthorized. This has been done extensively in the credit/debit card market, where card issuers have automated systems that study patterns to detect potential fraud. This would prevent a criminal from stealing a credit card from someone who only uses the card to buy groceries once a week and using that credit card to buy expensive jewelry twice a day. Obviously, the simplest computer program can flag that fraud and block the jewelry purchases. Unfortunately, criminals and especially sophisticated criminal organizations know this and have found ways to work around those blocks.

A criminal organization might purchase a dataset of a large number of credit card numbers and then automate the use of each credit card for a small purchase (that might later be converted to cash in the hands of the criminal organization) and get around fraud protections. As explained herein, those situations can be dealt with by having some limited resource that does not appear limited for authorized users but does appear limited for unauthorized automated attackers. As an example, each UE that is connected to a secured network resource might be allowed a set number of accesses in a time period (e.g., 20 accesses per day per UE, 1 access per five minute period, etc.). Unauthorized UEs that are relying on automation to make millions of accesses per day would be blocked.

Unfortunately, again, criminal organizations know this and might route around the blockage by having the unauthorized UE falsify information sent to the network resource so that the network resource sees a million accesses as coming from a million different UEs.

This document describes systems and techniques for weakly or strongly identifying specific end-UEs and their interfaces, despite the knowledge known to the attackers, and thereby thwarting attacks. In particular, attacks mounted by unauthorized users and/or their UEs using automated programs to replace human interaction with programs/apps (commonly referred to as "bots").

FIG. 1 is a swim diagram illustrating interactions of an example new app initialization and use process for a UE app. In this example, the UE app is assumed to be an application installed on a UE. Examples of UEs include smartphones or tablets running the iOS™ operating system or the Android™ operating system and can include UEs that obtain apps solely through a centralized repository of apps as well as those that obtain apps through other channels. The UE app might be obtained directly from a user operator or might be obtained from a centralized repository of apps. Examples of centralized repositories of apps include the App Store™ app repository operated by Apple Computer and the Google Play™ app marketplace.

In step 102, the UE app is installed. The UE app in this example is modified to add uniquely identified API calls, such that the API call identifies the particular instance of the UE app. In other variations, those uniquely identified API calls might be native, built-in, and/or preexisting rather than modified. Where the UE has an original (non-unique API call protocol) API and a modified, uniquely identified API call protocol API, it may be that the necessary modifications occur by changing a library used by program code, such as a library linked at compile time. As explained later in this example, since UE app and an API call filtering system (herein, a "botwall") are configured such that each UE is initialized with respect to the botwall before the UE app provides original intended functionality, this can happen when the app first starts executing.

In step 104, the UE (or operating system or other code executing on the UE for this purpose) determines whether the UE app has been used before or if this is the first use of the app (or if this is the first time the UE app has attempted to authenticate with the with the botwall). If so, flow proceeds to step 106. It may be that the UE app has been used before, but perhaps on a different hardware platform or it was deleted and restored, but in some of those cases, the UE app is treated as not having been run before. This determination might be done by having the UE app check data storage on the UE for a unique UE identifier ("UEIN") stored there. This determining process in effect determines that the UE app needs a UEIN in order to proceed.

In step 106, after determining that a UEIN is needed, the UE app or the UE obtains a UEIN 105 to be associated with that instance of the UE app. Various subprocesses for generating UEINs are described hereinbelow. In some subprocesses, the botwall generates the UEIN. For example, the botwall might generate a 128-bit random number that the UE app is to use as the UEIN. This step is preferably iteration-limited, so that a rogue user cannot easily generate a huge number of UEINs.

Since the generation of a new UEIN would happen fairly infrequently in the course of legitimate operation, adding a user interface step to the process would not be burdensome. As an example, the UE app might provide a browser window in a native UE app interface. An example of such a technique might be to have the UE app call a "WebView" object, attach it to a window, and send a load request message to the object's frame. This might make the browser window appear to the user to be an integrated part of the UE app, while allowing background processes to treat the object as a fully functional browser. With a fully functional browser, anti-automation techniques used for web interfaces could be applied here.

Once generated, UEIN 105 is transmitted to the UE (step 107) as well as being stored local to the botwall (step 108). Once this initialization process is complete, the UE has a UEIN to associate with that instance of the UE app (and that UEIN might persist across changes of UE, IP address, configurations of hardware, etc.) and the botwall has the UEIN associated with that instance of the UE app. In some embodiments, the UEIN is sent as a secured payload so that interlopers cannot discover it or alter it to their benefit.

In this example of FIG. 1, it can be assumed that the UE has not previously run or initialized the UE app, or has been reset, wiped, or reconfigured to appear to have not previously run or initialized the UE app. It should be understood that the installation/use of the example UE app described in detail can be independent of the installation/use of other apps on the UE. While some UEs might be configured to execute one and only one dedicated app, other UEs might be configured to run as many apps as the user choses, subject to storage constraints.

Subsequent API operations between the UE app and the web service are tagged with the UEIN. The API messages are intercepted by the botwall and, if the UEIN is valid, it is stripped from the message and the message is then forwarded to the original web service or supporting server, as will be explained with the flow proceeding to step 120. If the UE app is installed and it is determined that the UE app has already been initialized, flow passes to step 114, where the UEIN is read by the UE app (and/or its library) and flow passes to step 120.

By personalizing the API for each UE, by requiring the UEIN be appended for each API call, the botwall can count the number of API calls from each unique UE. For example, a dozen attempts to authenticate from one UE during one day might be normal, but a thousand is clearly not an appropriate use of a single UE and is most likely and iterative kind of attack. The count of legitimate and the illegitimate uses of API calls are likely to differ by orders of magnitude. To protect the UEINs from being reasonably guessed by the attacker, the UEIN protection could be based on probability (i.e., a large random number).

At step 120, when the UE app initiates an API call request 123, it makes the call using the UEIN as one of its arguments and sends it toward the botwall and/or the supporting service). The botwall in turn will test the UEIN for validity, log the UEIN and API call request, and strip out the UEIN to form a different API call request 127 that is sent towards the API supporting service. Where the botwall tests the UEIN for validity and finds that it is not valid, determines that the API call volumes for the UEIN are above a threshold between normal use and unauthorized use, or the like, the botwall can block, drop or alter the API call request. In some cases, API call request 127 is identical to API call request 123, but in preferred implementations, API call request 127 is not UEIN-specific and API supporting services that are UEIN-unaware will process API calls correctly. In some implementations, exceeding a permitted API call volume would trigger the botwall to delete the associated UEIN from the botwall's list of valid UEINs.

If the botwall does pass API call request 127, the supporting service (such as a set of servers programmed to support a particular API, using HTTP or other protocol) would receive the API call (step 130) and field the API call by generating and returning (step 132) the appropriate call response 135 to the UE app, which would then continue processing as programmed (step 140). This process would be repeated as often as needed.

An attacker would have difficulty exercising the process of FIG. 1 that generates UEINs in high volume to generate a large supply of UEINs, at least because there is at least one browser window within the UE app that operates the UE's native web browser in a way that appears to be part of the native app and onto which web-based anti-automation countermeasures and techniques can be applied.

In a specific example, the UE app is developed using and SDK. A part of the SDK establishes a WebView object and requests the WebView components (HTML, CSS, JavaScript) from an anti-automation polymorphism engine using a URL specifically coded. The request need not be forwarded to the web site origin or API endpoint. The anti-automation polymorphism engine then serves a special single-page app built with polymorphic defenses. Upon successful interaction with the botwall, UEIN is provided to the UE, possibly in response to an AJAX request. To create a logical reason for the visitor to interact with the botwall, the page could be a replacement for the normal login function of the native app. In this case, the botwall-linked login is only used when no valid UEIN exists, otherwise the visitor logs in using the normal flow through the native app. Tying the botwall to the login provides an added advantage that the issuance of a UEIN also requires valid credentials, thus preventing attacks that just generate UEIs for future use. In some embodiments, the WebView components, such as AJAX requests, can be prestored at the UE.

Figure 2:
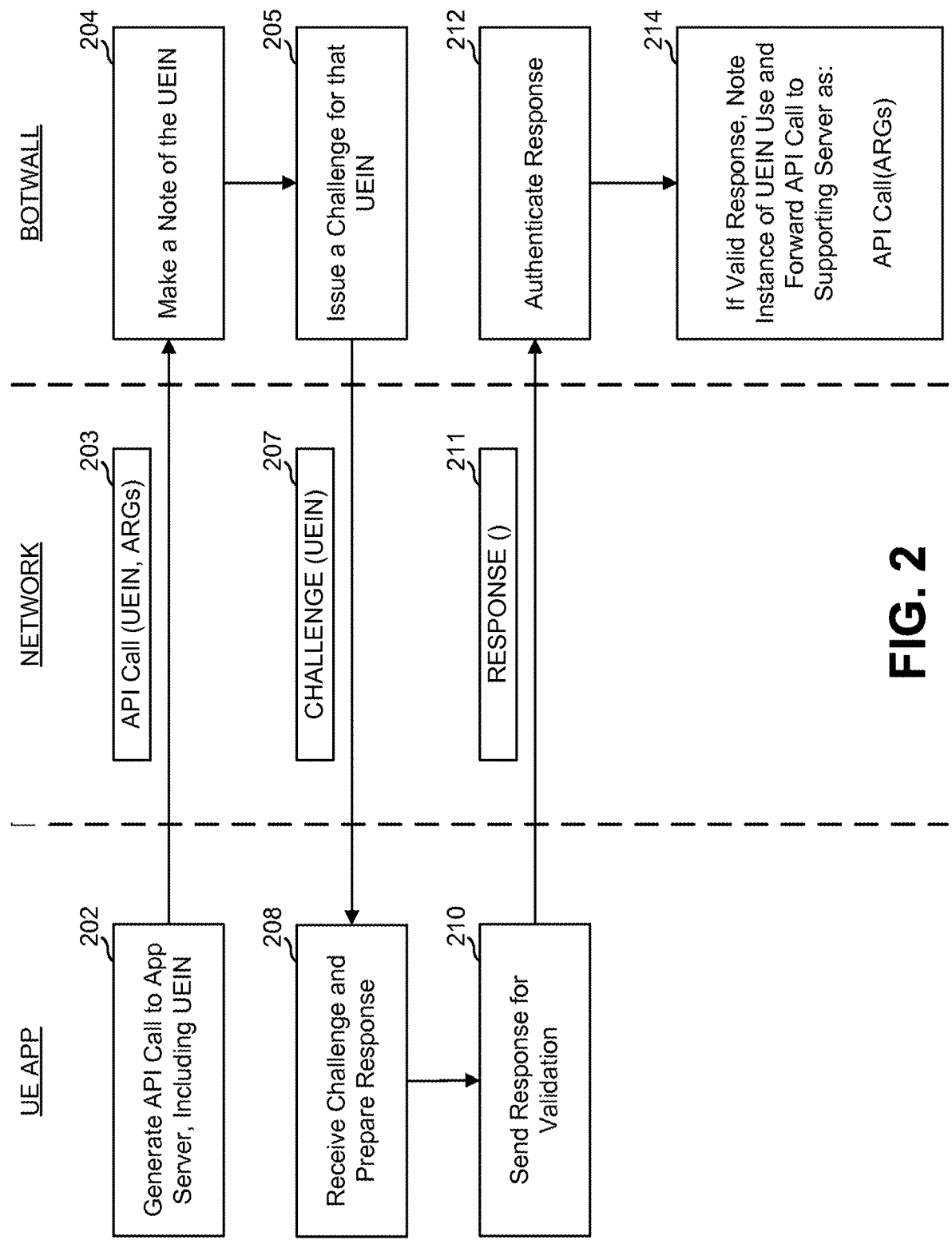
FIG. 2 is a swim diagram illustrating interactions of an initialized app running on a UE computer system and a server servicing API calls for that app.

FIG. 2 is a swim diagram illustrating interactions of an initialized UE app running on a UE computer system (such as a UE) and a supporting server servicing API calls for that app with additional steps. As the UE is executing the UE app, the UE app's program code might reach a point where the UE app wants to make an API call toward the supporting server, where it will be intercepted by the botwall. Alternatively, the UE app might direct all API calls directly to the botwall. The UE app would then generate the API call (step 202) and send an API call request 203 to the appropriate place (in FIG. 2, this is illustrated as being the botwall, but it could be otherwise). API call request 203 would include the UEIN as well as any arguments required by the API call.

Once the API call request is received by the botwall, the botwall makes a note of the UEIN (step 204) and then issues (step 205) a challenge message 207 to the UE/UE app. One purpose of this challenge message is so that the botwall can authenticate that the UE is the UE associated with the proffered UEIN. The UE receives the challenge message (step 208), prepares a response message 211 and sends the response message 211 to the botwall (step 210). The response message 211 is such that it contains information that could not have easily been generated apart from the UE app that is associated with that UEIN.

The botwall then authenticates the response message (step 212). If the response is valid, thus indicating that that UE app is indeed associated with that UEIN, the botwall notes (step 214) the instance of use of that API call with that UEIN and forwards the API call (possibly with the UEIN still included, or removed) toward the supporting server. If at step 214, the botwall determines that the UEIN is not valid, the botwall can choose not to reply to the API call request.

In other variations, the API supporting server and botwall are more tightly integrated, such as being on the same machine or using intermingled code. However, this may require modifications of the API supporting server. For example, the filtering process for API calls could be built directly into the supporting service system.

In the manner described above, API calls, even though automated, can be limited. For example, it might be acceptable to accept up to ten login/authentication API request messages related to one UE in a short period of time, but it typically not acceptable to field tens of thousands of login/ authentication API request messages from a given UE.

In a specific embodiment of a botwall, the challenge is a random number generated by the botwall that the UE app (or UE) then encrypts using the UEIN. The response is sent to the botwall, which then decrypts the challenge response using the previously stored UEIN. If the decrypted challenge response includes the random number that the challenge message included, as well as the correct UEIN, the botwall should be able to safely assume that the correct UE app/UE performed that action, as the UEIN should only exist in the context of that UE app. If the UE app/UE fails the challenge, the botwall might just discard the rest of that transaction.

Even if the challenge response is successful, since the botwall has the UEIN for each API call that uses these features, transaction volume can be measured and where a rational rate is exceeded (e.g., a rate that would be allowed for ordinary users), the botwall might drop that API call and delete/forget the UEIN, thus invalidating future UEIN-based API calls from that UE app (until a new UEIN is generated at least).

In some variations, not all API calls are required to include the UEIN, but where it is included, the botwall can easily correlate transaction requests with UEINs. The botwall can do this even while UE fingerprints change (e.g., when one user gets a new UE, a UE is restarted, when an IP address changes, etc.).

Of course, some determined hackers could delete the app, redownload it, and start the initialization process, thereby getting a new UEIN. Since a legitimate user might only get an additional new UEIN when purchasing a new UE, limits on the frequency or volume of new UEINs would not burden legitimate users, but would thwart hacking attempts that use a small number of UEs to make a large number of API calls and try to bypass the speed controls, as the hacking attempt would involve attempts to generate many orders of magnitude more UEINs than are legitimately needed.

To block unauthorized access by an unauthorized person while not encumbering legitimate users of an API service, a threshold might be set for the number, frequency, location, etc. of new UEIN registrations. The threshold does not need to be fixed, or exact, as the difference between the two cases is typically quite wide.

A typical credential stuffing attack might take 1,000,000 username-password pairs, known to work on other web sites, and test them on the target of interest in an attempt to discover where the credentials have been reused. Examples of credentials include passwords, OAuth keys, and the like. Whereas a typical accidently incorrect password entry by a legitimate user might result in less than ten tries of username and password, the attack needs at least thousands of iteration to be minimally effective. As explained herein, one approach of prior art might attempt remediation by applying rate limits on the IP address. For example, once an app server receives 100 login attempts from one IP address the app server can block all further traffic from that IP address or UE hardware. Without more, this might also block legitimate users (suppose the IP traffic from hundreds of legitimate users is routed through one IP address such as occurs in the office environment of a large company) and further this approach might allow attackers to pass, if they route their traffic through multiple proxies to make it appear that one UE is actually many different UEs. Another approach of prior art is to limit rates associated with a device "fingerprint" which is certain properties about the device such as the type of browser, operating system version, clock skew, etc. The outcome is the similar to rate limiting by IP address, attackers simply alter the fingerprint to other obviously valid permutations.

As explained herein, to prevent (or at least encumber) a hacker from spoofing the botwall to hide the fact that a large number of user credential uses are coming from the same UE app, UEs are uniquely identified. To prevent (or at least encumber) a hacker from responding by having UEs generate new UEINs for every iteration of the attack or for every few iterations, the UEIN generation process can be tied to some subprocess that works well for small numbers, but not well for large numbers.

One example of such a subprocess is to tie the UEIN generation to a specific IP address. This can be a soft barrier. Suppose that each time some UE requests a new UEIN, the botwall records the IP address from which the request came. That way, if volumes exceed rational rate thresholds, then requests from the associated IP addresses might be subject to additional scrutiny for a time period, or additional non-automatable steps might be imposed on the user beyond just the standard Webview-type invocation.

It might be that the botwall includes a non-automatable step for every UEIN generation. While this would add an extra step even for legitimate users, they would not see that extra step that often, perhaps only when switching to a new UE. That non-automatable step might involve a web page that is configured to block/frustrate automated interaction with that web page.

In another approach, the botwall performs an in-band or out-of-band step that makes use of an address space limited domain. As an example, a user's telephone number can be verified by an out-of-band process or non-automatable step. If the botwall required each request for registration of a new UEIN to include a valid telephone number in the custody of the user, the app server could verify that telephone number by sending an SMS message to that number, placing an IVR call to that number, etc., and waiting for a user response.

The app server need not be hardcoded to reject multiple requests from the same telephone number, as that might typically happen when multiple legitimate users are sharing a telephone number or a user gets a new UE without a new telephone number. However, the app server can be coded to reject large numbers of requests from a given telephone number. Since a criminal organization performing some network attacks via an automation of API calls would likely need to execute a large volume of API calls (in part to account for a very low hit rate), they would be blocked from large scale automation in part by the fact that telephone numbers comprise an address space limited domain (in particular, the address(es) available to the attacker). Thus, with UEIN registration requests each being correlated with a verifiable telephone number, attackers might not be able to obtain enough telephone numbers to produce sufficient different UEINs to allow the attackers to run sufficient number of automated iterations. Telephone numbers associated with excessive iterations might be temporarily or permanently black-listed.

Tying the registration of new UEINs to the possession of a telephone number creates a supply problem for the attacker, but not the legitimate user. This is because all legitimate users possess telephone numbers in sufficient quantity to register for any rational use. All attacks relying on iteration are deficient, by orders of magnitude, a sufficient quantity of unique telephone numbers to create valid registrations. The tying of registrations to telephone numbers could be implemented in or more of several ways. For example, the registration might involve an IVR telephone call to the user wherein the app server sends the user an access code over the network channel and prompts the user to enter that access code into the telephone. The app server might just request any response, which would block attackers that are not able to feasibly receive and respond to tens of thousands of telephone calls.

As explained herein, in effect, the API usable by each UE is personalized to that UE and automating volume requests that should not be in volume are filtered out because too many come from one UEIN/UE. If there are limits to the rate at which UEINs can be created, then it can become infeasible for an attacker to bypass the filtering by rapidly changing the UEIN or spoofing it. Thus, by personalizing each API, the attacker cannot run sufficient iterations though one API case or find/generate enough API cases to support the iterations required for a successful attack.

This can be used apart from, or in combination with, polymorphic object code procedures.

An API iteration attack relies on high iterations of a machine-to-machine ("M2M") API. Since it is often a simple matter to reverse-engineer and understand an M2M API interface, the attacker can masquerade as any expected UE/application simply by exhibiting the correct behavior while exercising the API. Because of the use of Wi-Fi for mobile device communication, and other reasons, IP addresses alone might not be a useful way to identify real mobile UEs. However, a typical attack that expects to create value by exercising an API iteratively will need millions of iterations to scale to the point where it can be sufficiently monetized to justify the attention of criminal enterprise and to produce losses worth mitigating. Through a combination of limiting the number of API calls from one UE and limiting the number of UEINs that can be assigned, this attack is likely rendered infeasible.

The initialization process could be transparent or semi-transparent to the user. For example, once the user installs an app that is protected with the personalized API, and runs the app for the first time, the UE app can obtain the UEIN and verify the smartphone's telephone number, all without user interaction. A message to the botwall might be in the form of an SMS sent via commonly available API's for smartphone apps. Short messages are correlated to network part of the transaction and the telephone number of the UE can be obtained from the inbound SMS header.

Where it is possible to spoof the telephone number in the SMS header, added security might be provided by having the botwall sends a challenge number via SMS to the telephone number provided. Using the SMS API, the UE app can capture this number and send it back to the app server. This might use a type 0 SMS (silent) message so not to disturb the user.

In other variations, a transparent wrapper is used to wrap native app object code with more object code and intercept outbound socket connections. That connection might be directed to a botwall. Anti-automation protocol is settled first and then traffic is routed from the botwall to the web service, which sees the API as it was previously expected. In yet other variations, the native app developer incorporates a library instead of wrapping object code. In some variations, there is a separate UE app for handling the processes of initialization and/or personalization and the native app calls that separate app. This might allow for more than one protected native app to share a single validation/registration, as well as correlating behavior over multiple apps.

Where the UE is a desktop computer, tablet, or the like, that does not have an assigned telephone number, the same approach could be taken by correlating with any telephone number in the possession of the UE app user, perhaps by the IVR method described herein, separate from the UE.

For publicly exposed APIs, an anti-automation library might be provided to the API user to do the UE part of the API personalization problem. Registrations might then be handled by a special web page flow on the API provider's site and may also correlate registrations with any telephone number using the IVR method.

For some web sites that cannot accommodate other defenses, the personalized API methods and apparatus described herein might be used where the UEIN is generated at on a specific web page created to block automation and then the UEIN is validated on all subsequent web pages.

Figure 3:
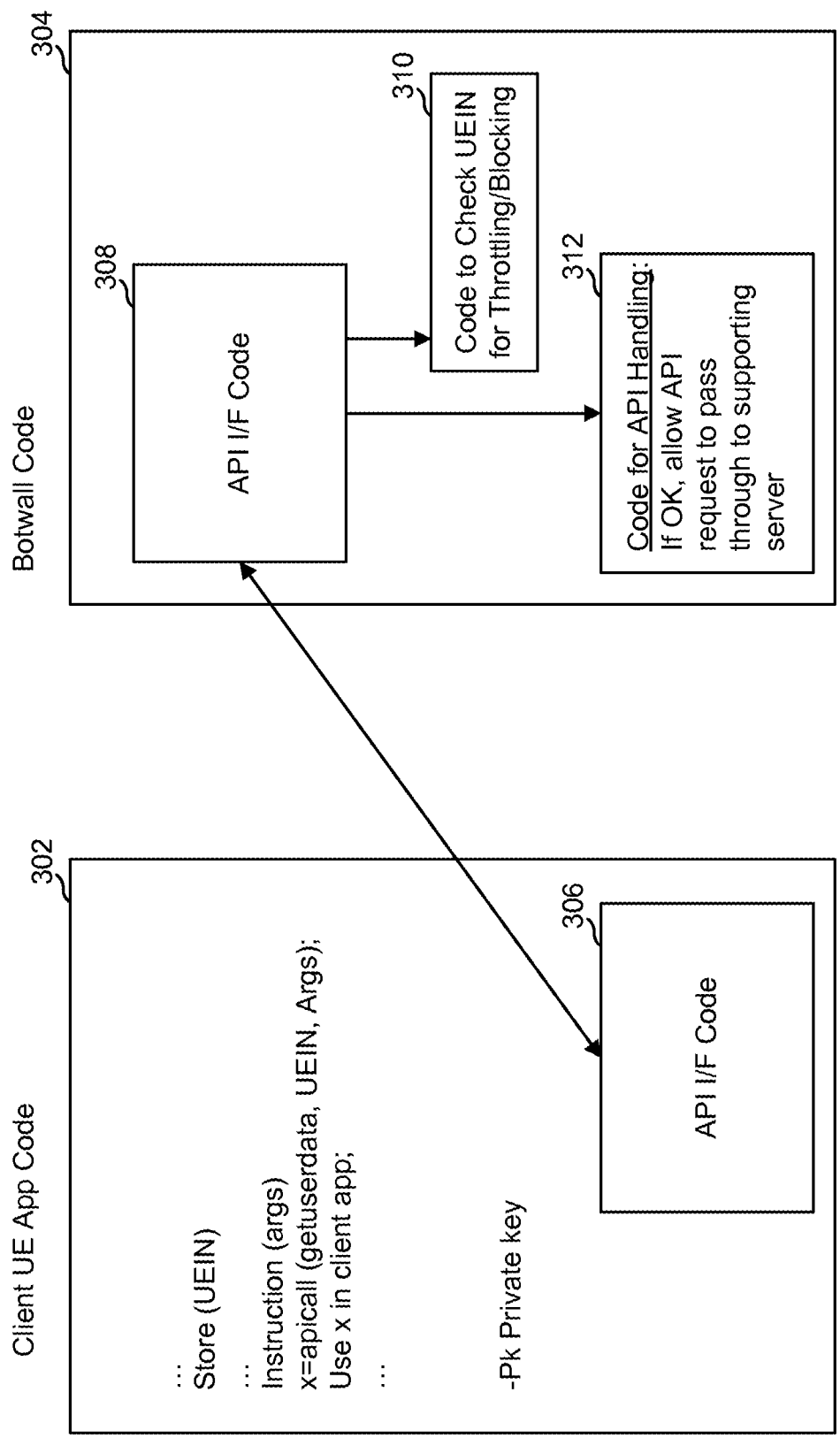
FIG. 3 is a block/functional diagram illustrating several components of program code that might interact to handle API servicing.

FIG. 3 is a block/functional diagram illustrating several components of program code that might interact to handle API servicing. FIG. 3 shows UE app code 302, as might be executed by a UE, app server code 304, as might be executed by, or as part of, a web server or other app server, with UE app code 302 including API interface code 306 and server app code 304 including API interface code 308. The API interface code portions 306, 308 might interact with each other over the Internet.

As illustrated in FIG. 3 and elsewhere, UE app code 302 includes functionality to obtain and store a UEIN for the UE that is executing UE app code 302. During execution, when the UE's processor encounters an API call (illustrated in FIG. 3 as "x=apicall(getuserdata, UEIN, ARGs)" as an example), that code calls API interface code 306, which in turn performs one or more of the processes described herein to interface to the botwall. Once the apicall( ) function returns a value or values from the supporting service, the UE app can use that information.

App server code 304 might include separate code sections for code 310 to check UEIN usage and apply throttling as deemed appropriate, and code 312 for API handling if code 310 allows an API request from a UE to pass.

Figure 4:
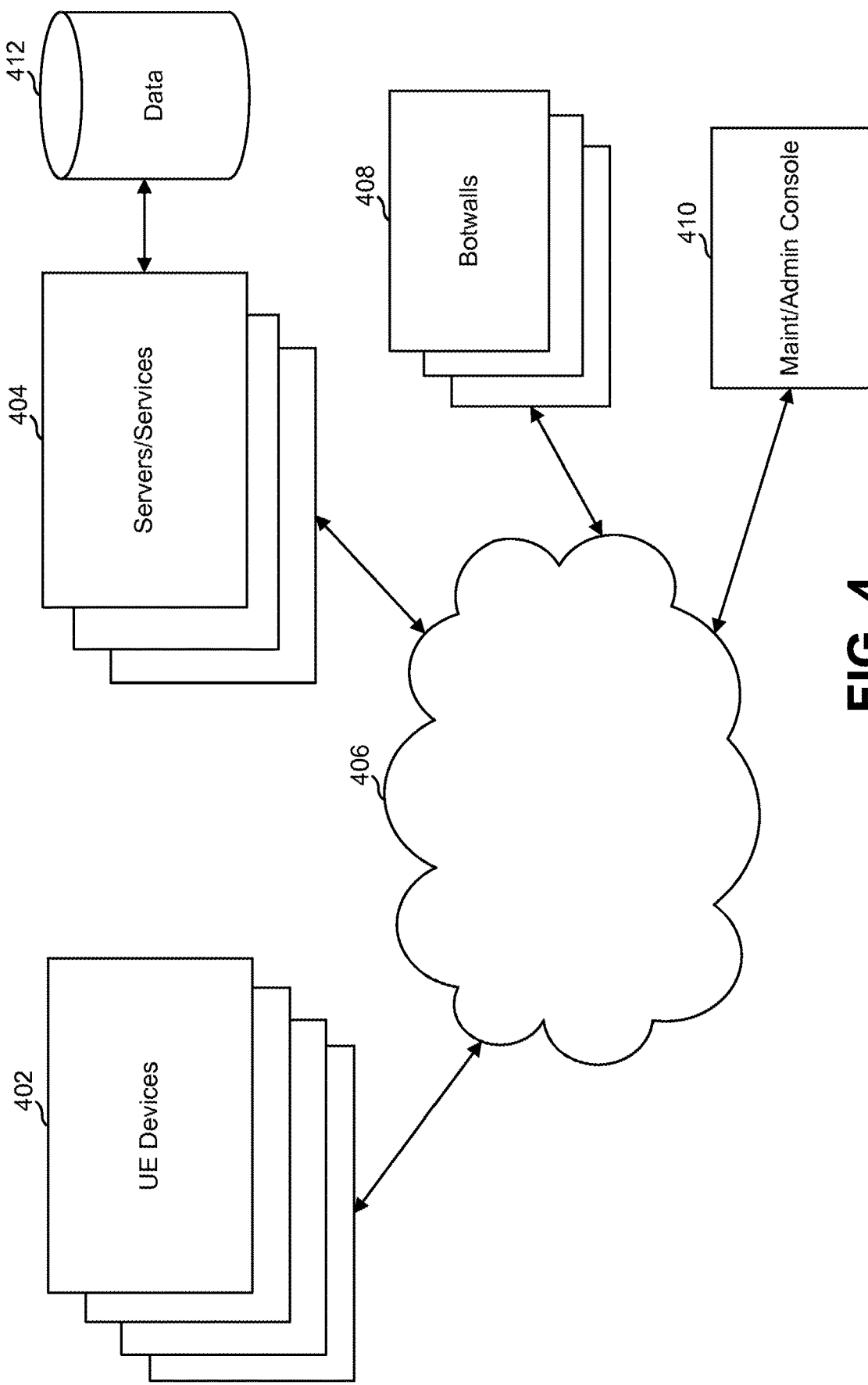
FIG. 4 is a block diagram of a networked computer system in which the processes and elements of FIGS. 1-3 might be used.

FIG. 4 is a block diagram of a networked computer system in which the processes and elements of FIGS. 1-3 might be used. As illustrated there, a networked computer system 400 comprises one or more client/UE/UEs 402 operated by users (and some attackers, possibly) to interface to one or more API supporting servers 404 via a network 406. Networked computer system 400 includes at least one botwall 408 and a maintenance and administrative console 410, each of which might be able to communicate via network 406. Servers 404 might be coupled to data stores 412. In another variation not shown, botwall 408 and server 404 are connected such that all traffic to and from server 404 has to pass through botwall 408.

Figure 5:
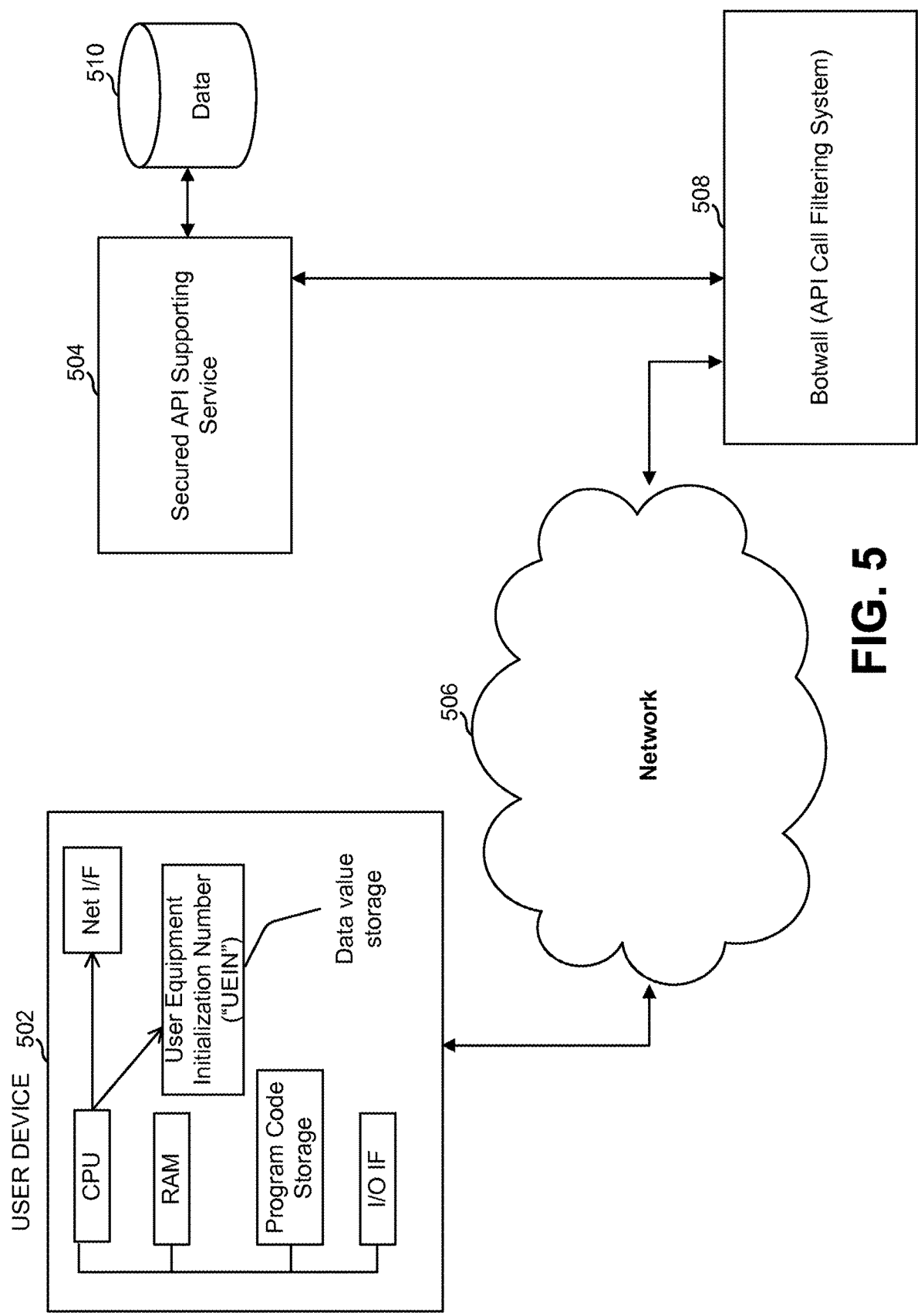
FIG. 5 is a block diagram of parts of FIG. 4 shown in greater detail.

FIG. 5 is a block diagram of parts of FIG. 4 shown in greater detail, but for only one UE and one supporting server. As shown there, a UE 502 communicates with a secured API supporting service 504 that is secured against a high-volume automated API attack using methods and apparatus described herein, and also communicates with a botwall 508. The communication shown is via a network 506, but additional paths, as explained elsewhere herein, might be used. Secured service 504 might provide UE 502 with access to data store 510 and/or other networked resources.

A UE or app server, etc. might include various components. For example, a UE might comprise a central processing unit ("CPU"), random access memory, storage for data values such as a private key and a UEIN, a network interface and an input/output interface. A system bus might connect the various components.

Typically, the CPU capable of processing instructions for execution that it reads from program code storage, which might be RAM, ROM, flash, magnetic storage, etc. The CPU may be designed using any of a number of architectures, such as a CISC (Complex Instruction Set Computer) processor, a RISC (Reduced Instruction Set Computer) processor, or a MISC (Minimal Instruction Set Computer) processor. The CPU might be a single-threaded processor or a multi-threaded processor. Additional functionality might be provided by a graphics I/O system and processor.

In some implementations, the memory used is a computer-readable medium, such as a volatile memory unit or a non-volatile memory unit. Various storage devices might be capable of providing mass storage for various needs. For example, in one implementation, storage devices comprise flash drive devices, floppy disk devices, hard disk devices, optical disk devices, tape devices, or the like.

Input/output devices might include a keyboard and/or pointing device and a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data. Storage devices suitable for tangibly embodying computer program instructions and data include many forms of non-volatile memory, including, by way of example, semiconductor memory devices, such as EPROM, EEPROM, and flash memory devices, magnetic disks such as internal hard disks and removable disks, magneto-optical disks; and CD-ROM and DVD-ROM disks.

The processor and the memory can be supplemented by, or incorporated in, ASICs (application-specific integrated circuits). To provide for interaction with a user, the features can be implemented on a computer having a display device such as a CRT (cathode ray tube) or LCD (liquid crystal display) monitor for displaying information to the user and a keyboard and a pointing device such as a mouse or a trackball, or a touchscreen, by which the user can provide input to the computer. Additionally, such activities can be implemented via touchscreen flat panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by some form or medium of digital data communication such as a communication network. Examples of communication networks include a local-area network ("LAN"), a wide-area network ("WAN"), peer-to-peer networks (having ad-hoc or static members), grid computing infrastructures, and the Internet.

Figure 6:
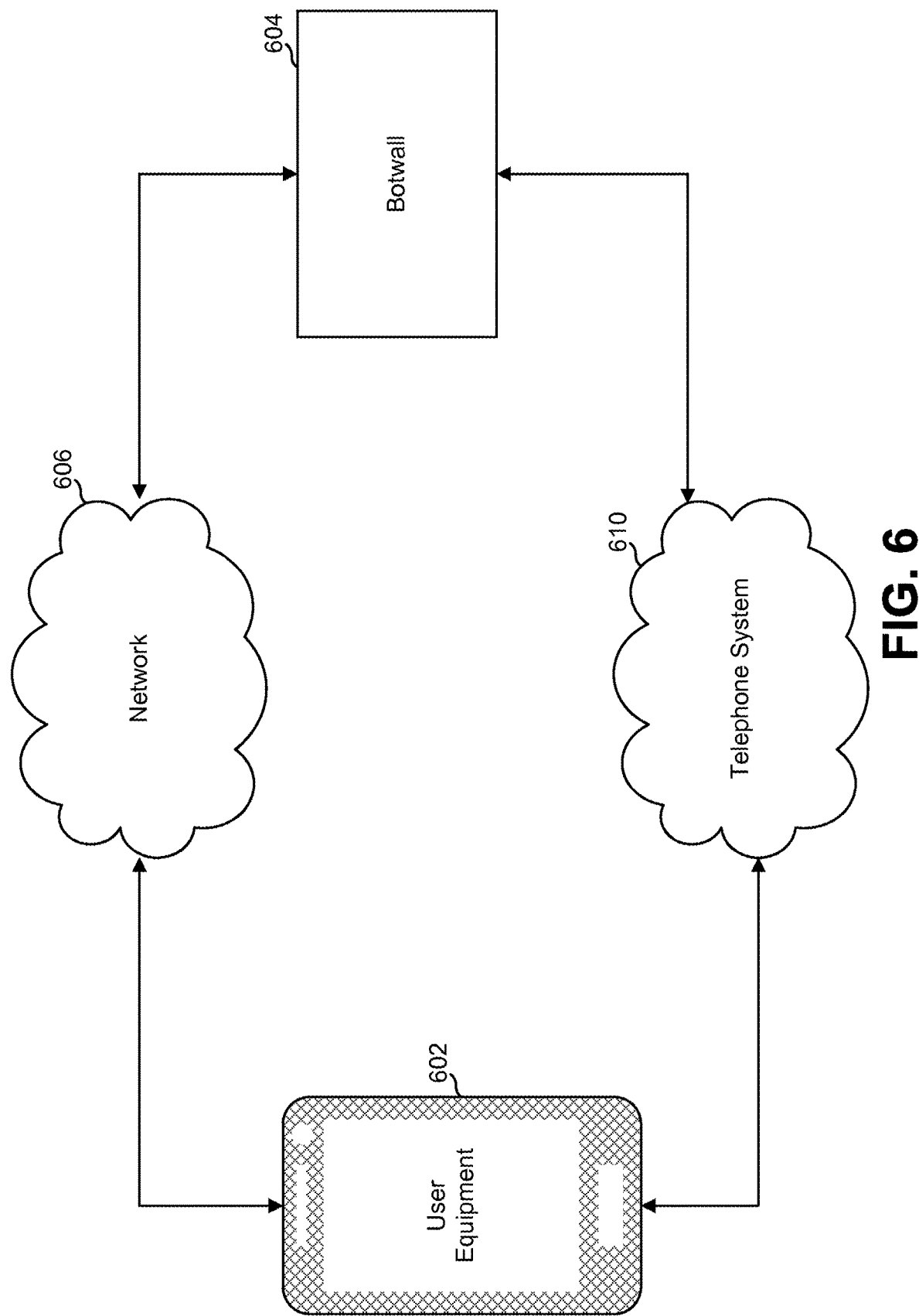
FIG. 6 is a block diagram of a specific arrangement, wherein an out-of-band, address space limited domain technique is used to make a high-volume API attack impractical, infeasible, and/or uneconomical.

FIG. 6 is a block diagram of a specific arrangement, wherein an out-of-band, address space limited domain technique is used to make a high-volume API attack impractical, infeasible, and/or uneconomical. As illustrated there, a UE 602 (such as a smartphone) interacts with a botwall 604 over a network 606, performing calls to an API served by botwall 604. Botwall 604 expects API calls to be personalized so that the UE (or some proxy of the UE) can be identified, so that botwall 604 can block calls that are beyond what a reasonable, legitimate UE would make. UE 602 might initialize itself to support a UEIN and PKI pair through network interactions or through out-of-band interactions, such as a telephone call through telephone system 610.

Figure 7:
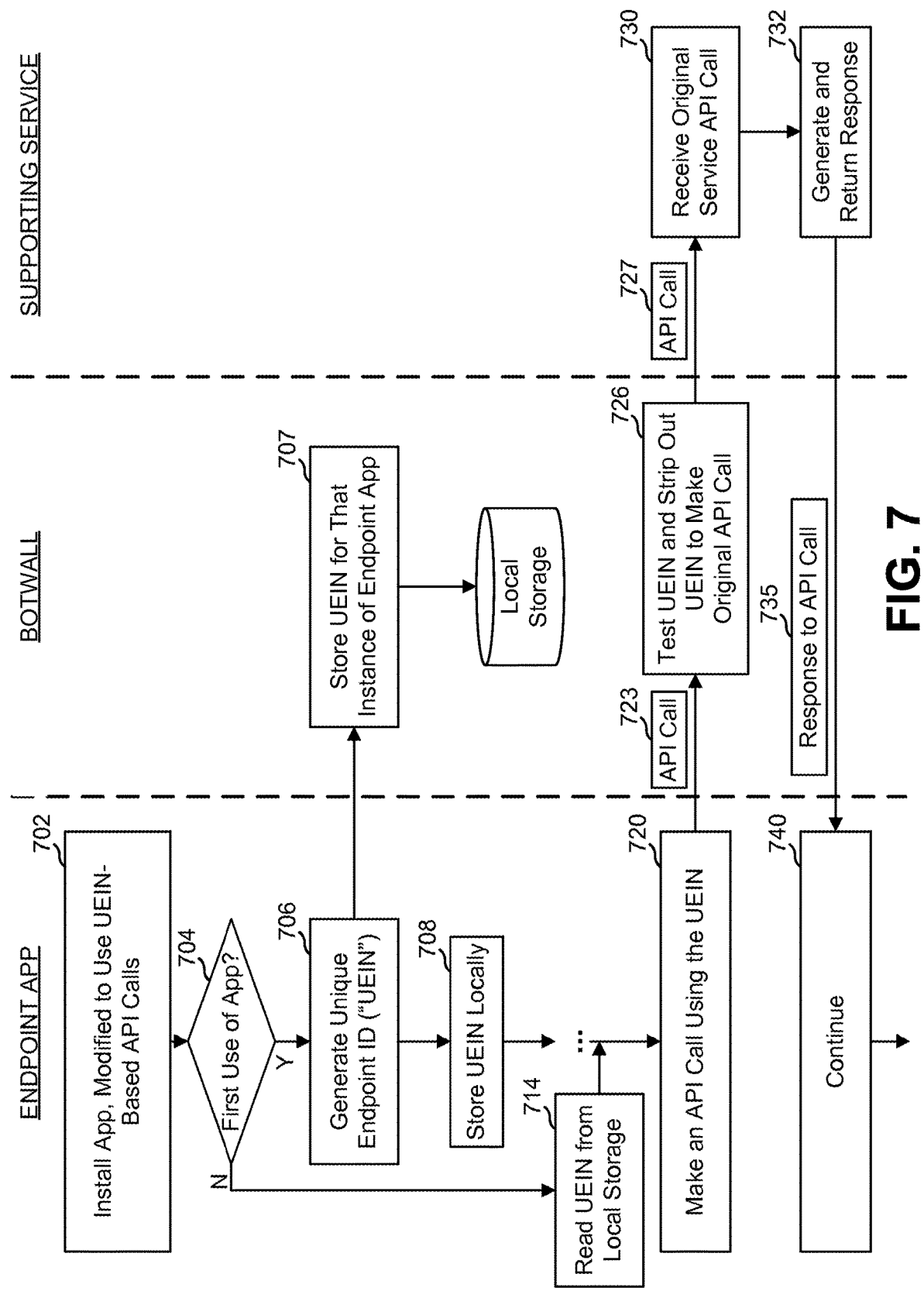
FIG. 7 is a swim diagram illustrating interactions of an example new app initialization process wherein a UE generates a new UE initialization number.

FIG. 7 is a swim diagram illustrating interactions of an example new app initialization and use process for a UE app, wherein a UE is the locus of UEIN generation. This is similar to the process illustrated in FIG. 1.

In step 702, the UE app is installed. The UE app and the botwall are configured such that each UE is initialized with respect to the botwall before the UE app provides original intended functionality. In step 704, the UE (or operating system or other code executing on the UE for this purpose) determines whether the UE app has been used before or if this is the first use of the app or if this is the first time the UE app has attempted to authenticate with the with the botwall. If so, flow proceeds to step 706.

In step 706, after determining that a UEIN is needed, the UE app or the UE generates a UEIN 705 to be associated with that instance of the UE app. Once generated, the UEIN 705 is transmitted to the botwall (step 707) as well as being stored local to the UE (step 708). Once this initialization process is complete, the UE has a UEIN to associate with that instance of the UE app (and that UEIN might persist across changes of UE, IP address, configurations of hardware, etc.) and the botwall has the UEIN associated with that instance of the UE app. In some embodiments, the UEIN is sent as a secured payload so that interlopers cannot discover it or alter it to their benefit.

Subsequent API operations between the UE app and the web service are tagged with the UEIN. The API messages are intercepted by the botwall and, if the UEIN is valid, it is stripped from the message and the message is then forwarded to the original web service or supporting server, as will be explained with the flow proceeding to step 720. If the UE app is installed and it is determined that the UE app has already been initialized, flow passes to step 714, where the UEIN is read by the UE app (and/or its library) and flow passes to step 720.

At step 720, when the UE app initiates an API call request 723, it makes the call using the UEIN as one of its arguments and sends it toward the botwall and/or the supporting service). The botwall in turn will test the UEIN for validity, log the UEIN and API call request, and strip out the UEIN to form a different API call request 727 that is sent towards the API supporting service. Where the botwall tests the UEIN for validity and finds that it is not valid, determines that the API call volumes for the UEIN are above a threshold between normal use and unauthorized use, or the like, the botwall can block, drop or alter the API call request. In some cases, API call request 727 is identical to API call request 723, but in preferred implementations, API call request 727 is not UEIN-specific and API supporting services that are UEIN-unaware will process API calls correctly. In some implementations, exceeding a permitted API call volume would trigger the botwall to delete the associated UEIN from the botwall's list of valid UEINs. Where the UEIN was generated using a PKI pair of the UE, the public key of the UE might be included in requests.

If the botwall does pass API call request 727, the supporting service (such as a set of servers programmed to support a particular API, using HTTP or other protocol) would receive the API call (step 730) and field the API call by generating and returning (step 732) the appropriate call response 735 to the UE app, which would then continue processing as programmed (step 740). This process would be repeated as often as needed.

The computer hardware described herein might be used with the computer software described herein unless otherwise indicated. The software can be written in one or more languages and be stored in different forms of memory or storage. The computer hardware described and illustrated might include various forms of digital computers, such as laptops, desktops, workstations, personal digital assistants, servers, blade servers, mainframes, and other appropriate computers.

The UE might include mobile devices, such as personal digital assistants, cellular telephones, smartphones, and other similar computing devices. Additionally the system can include portable storage media, such as Universal Serial Bus ("USB") flash drives. For example, the USB flash drives may store operating systems and other applications. The USB flash drives can include input/output components, such as a wireless transmitter or USB connector that may be inserted into a USB port of another computing device.

The computer system can include clients and servers. A client and server are generally remote from each other and typically interact through a network. The relationship of client and server arises by virtue of computer programs running on the respective computers and having a client-server relationship to each other. A UE is a device that connects, in some manner, to at least one of the servers, directly or indirectly, to perform some end goal. Where one device is designated as a UE, it may be that that UE is a client in some client-server relationship, but it could also be a server in some instances and there may be intermediaries that are treated as client-server combinations.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the following claims. Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Further embodiments can be envisioned to one of ordinary skill in the art after reading this disclosure. In other embodiments, combinations or sub-combinations of the above disclosed invention can be advantageously made. The specification and figures are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A network security method implemented by a network security system comprising one or more application programming interface (API) call filtering devices, application server devices, or user equipment (UE) devices, the method comprising:
    receiving an API call from a client, wherein the API call is to an API function of an API associated with a service provided by a server and comprises a UE identifier (UEIN);
    comparing the UEIN against a stored plurality of UEINs issued to authorized clients to verify that the requesting client is authorized to access the service;
    sending to the client a challenge in response to the API call after verifying that the client is authorized to access the service, wherein the challenge is an encryption challenge that requires the client to perform an encryption operation based on the UEIN;
    determining when a response message received from the client in response to the challenge is valid;
    modifying the API call to conform to an expected format of the API function at least by omitting the UEIN, and issuing the modified API call to the API function, in response to validating the response message;
    determining when a number of API calls comprising the UEIN exceed a threshold request volume; and
    initiating a security mitigation action, when the determination indicates the number of API calls exceeds the threshold request volume.

2. The network security method of claim 1, further comprising generating the stored UEINs in response to requests received from applications installed locally at the authorized clients.

3. The network security method of claim 1, further comprising blocking or dropping the API call, when the comparison indicates the client is unauthorized.

4. An application programming interface (API) call filtering device, comprising memory comprising programmed instructions stored thereon and one or more processors configured to be capable of executing the stored programmed instructions to:
receive an API call from a client, wherein the API call is to an API function of an API associated with a service provided by a server and comprises a UE identifier (UEIN);
compare the UEIN against a stored plurality of UEINs issued to authorized clients to verify that the requesting client is authorized to access the service; and
send to the client a challenge in response to the API call after verifying that the client is authorized to access the service, wherein the challenge is an encryption challenge that requires the client to perform an encryption operation based on the UEIN;
determine when a response message received from the client in response to the challenge is valid;
modify the API call to conform to an expected format of the API function at least by omitting the UEIN, and issue the modified API call to the API function, in response to validating the response message;
determine when a number of API calls comprising the UEIN exceed a threshold request volume; and
initiate a security mitigation action, when the determination indicates the number of API calls exceeds the threshold request volume.

5. The API call filtering device of claim 4, wherein the processors are further configured to be capable of executing the stored programmed instructions to generate the stored UEINs in response to requests received from applications installed locally at the authorized clients.

6. The API call filtering device of claim 4, wherein the processors are further configured to be capable of executing the stored programmed instructions to block or drop the API call, when the comparison indicates the client is unauthorized.

7. A non-transitory storage media comprising programmed instructions comprising executable code that, when executed by one or more processors, cause the processors to:
receive an API call from a client, wherein the API call is to an API function of an API associated with a service provided by a server and comprises a UE identifier (UEIN);
compare the UEIN against a stored plurality of UEINs issued to authorized clients to verify that the requesting client is authorized to access the service; and
send to the client a challenge in response to the API call after verifying that the client is authorized to access the service, wherein the challenge is an encryption challenge that requires the client to perform an encryption operation based on the UEIN;
determine when a response message received from the client in response to the challenge is valid;
modify the API call to conform to an expected format of the API function at least by omitting the UEIN, and issue the modified API call to the API function, in response to validating the response message;
determine when a number of API calls comprising the UEIN exceed a threshold request volume; and
initiate a security mitigation action, when the determination indicates the number of API calls exceeds the threshold request volume.

8. The non-transitory storage media of claim 7, wherein the executable code, when executed by the processors, further causes the processors to generate the stored UEINs in response to requests received from applications installed locally at the authorized clients.

9. The non-transitory storage media of claim 7, wherein the executable code, when executed by the processors, further causes the processors to block or drop the API call, when the comparison indicates the client is unauthorized.

10. A network security system, comprising one or more application programming interface (API) call filtering devices, application server devices, or user equipment devices with memory comprising programmed instructions stored thereon and one or more processors configured to be capable of executing the stored programmed instructions to:
receive an API call from a client, wherein the API call is to an API function of an API associated with a service provided by a server and comprises a UE identifier (UEIN);
compare the UEIN against a stored plurality of UEINs issued to authorized clients to verify that the requesting client is authorized to access the service; and
send to the client a challenge in response to the API call after verifying that the client is authorized to access the service, wherein the challenge is an encryption challenge that requires the client to perform an encryption operation based on the UEIN;
determine when a response message received from the client in response to the challenge is valid;
modify the API call to conform to an expected format of the API function at least by omitting the UEIN, and issue the modified API call to the API function, in response to validating the response message;
determine when a number of API calls comprising the UEIN exceed a threshold request volume; and
initiate a security mitigation action, when the determination indicates the number of API calls exceeds the threshold request volume.

11. The network security system of claim 10, wherein the processors are further configured to be capable of executing the stored programmed instructions to generate the stored UEINs in response to requests received from applications installed locally at the authorized clients.

12. The network security system of claim 10, wherein the processors are further configured to be capable of executing the stored programmed instructions to block or drop the API call, when the comparison indicates the client is unauthorized.

* * * * *